(12) United States Patent
Salot et al.

(10) Patent No.: US 10,470,218 B2
(45) Date of Patent: Nov. 5, 2019

(54) SYSTEM AND METHOD FOR OPTIMIZED IDLE AND ACTIVE STATE TRANSITIONS OF USER EQUIPMENT IN A NETWORK ENVIRONMENT

(71) Applicant: CISCO TECHNOLOGY, INC., San Jose, CA (US)

(72) Inventors: Nirav Salot, Pune (MH); Sridhar Bhaskaran, Coimbatore (IN); Sebastian Speicher, Wallisellen (CH); Maulik Vijay Vaidya, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 15/228,934

(22) Filed: Aug. 4, 2016

(65) Prior Publication Data

US 2017/0332424 A1 Nov. 16, 2017

Related U.S. Application Data

(60) Provisional application No. 62/337,174, filed on May 16, 2016.

(51) Int. Cl.
*H04W 74/08* (2009.01)
*H04L 12/26* (2006.01)
(Continued)

(52) U.S. Cl.
CPC ......... *H04W 74/0833* (2013.01); *H04L 43/16* (2013.01); *H04W 4/02* (2013.01);
(Continued)

(58) Field of Classification Search
None
See application file for complete search history.

(56) References Cited

U.S. PATENT DOCUMENTS

| 8,526,953 B2 | 9/2013 | Alanara et al. |
| 2011/0124334 A1 | 5/2011 | Brisebois et al. |

(Continued)

FOREIGN PATENT DOCUMENTS

| EP | 2725852 A1 | 4/2014 |
| EP | 2757856 | 7/2014 |

OTHER PUBLICATIONS

"3GPP TS 23.401 V13.6.1 (Mar. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Mar. 2016; 365 pages.

(Continued)

*Primary Examiner* — Chi H Pham
*Assistant Examiner* — Raul Rivas
(74) *Attorney, Agent, or Firm* — Patterson + Sheridan, LLP

(57) ABSTRACT

An example method is provided in one example embodiment and may include determining that a user equipment (UE) is approximately stationary for a threshold period of time within a particular geographic area based, at least in part, on a radio access network (RAN) node to which the UE is attached; notifying the UE that the UE has been associated with the particular geographic area; and transitioning the UE into an idle mode from an active mode, wherein the transitioning is performed without notifying a core network that the UE has transitioned to the idle mode. Determining that the UE is approximately stationary can include monitoring mobility signaling from the UE and comparing an amount of time that the UE has been attached to the RAN node with a (Continued)

threshold period of time. The core network can be notified when the UE moves out of the particular geographic area.

20 Claims, 7 Drawing Sheets

(51) Int. Cl.
| | |
|---|---|
| *H04W 4/02* | (2018.01) |
| *H04W 40/00* | (2009.01) |
| *H04W 52/02* | (2009.01) |
| *H04W 76/27* | (2018.01) |
| *H04W 76/14* | (2018.01) |
| *H04W 88/12* | (2009.01) |
| *H04W 64/00* | (2009.01) |

(52) U.S. Cl.
CPC ..... *H04W 40/005* (2013.01); *H04W 52/0258* (2013.01); *H04W 76/14* (2018.02); *H04W 76/27* (2018.02); *H04W 52/0212* (2013.01); *H04W 52/0229* (2013.01); *H04W 64/006* (2013.01); *H04W 88/12* (2013.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/20* (2018.01); *Y02D 70/23* (2018.01); *Y02D 70/26* (2018.01)

(56) References Cited

U.S. PATENT DOCUMENTS

| | | | |
|---|---|---|---|
| 2015/0016412 | A1 | 1/2015 | Horn et al. |
| 2015/0045020 | A1 | 2/2015 | Wang et al. |
| 2018/0302947 | A1* | 10/2018 | Yan ................... H04W 76/27 |

OTHER PUBLICATIONS

"3GPP TS 23.401 V13.7.0 (Jun. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Jun. 2016; 372 pages.
"3GPP TS 23.401 V14.0.0 (Jun. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP, 650 Route des Lucioles—Sophia Antipolis Valbonne—France, Jun. 2016; 374 pages.
Van de Velde, Thierry, "How the Next-Generation Mobile Core could accommodate Network Slicing," blog post on Netmanias Analyze Trends, Technologes and Market, Dec. 24, 2015; 6 pages.
3GPP TSG-SA2 WG2 Meeting #110, Document S2-152354, "RAN Based Extended Idle Mode DRX," Dubrovnik, Croatia, Jul. 6-10, 2015; 6 pages.
3GPP TSG-RAN Meeting #68 Meeting #68, Document TP-150872, "New WID Proposal: Signalling Reduction for Idle-Active Transitions in LTE," Malmo, Sweden, Jun. 15-18, 2015; 7 pages.
"ETSI TS 136 401 V8.5.0 (Apr. 2009) Technical Specification: LTE; Evolved Universal Terrestrial Radio Access Network (E-UTRAN); Architecture description (3GPP TS 36.401 version 8.5.0 Release 8)," ETSI, 650 Route des Lucioles F-06921 Sophia Antipolis Cedex—France, Apr. 2009; 21 pages.
"ETSI TS 136 300 V13.3.0 (Apr. 2016) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 13.3.0 Release 13)," ETSI, 650 Route des Lucioles F-06921 Sophia Antipolis Cedex—France, Apr. 2016; 300 pages.
5G PPP Metis II White Paper, "Preliminary Views and Initial Considerations on 5G RAN Architecture and Functional Design," Published on Mar. 8, 2016, Patrick Marcsch and Icaro Da Silva, Editors; 27 pages.
"3GPP TR 23.799 V0.4.0 (Apr. 2016) Technical Report: 3rd Generation Partnership Project; Technical Specification Group Services and System Aspects; Study on Architecture for Next Generation System (Release 14)," 3GPP, 650 Route des Lucioles—Sophia Antipolis Valbonne—France, Jun. 2016; 374 pages.
"3GPP TR 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3GPP, 650 Route des Lucioles—Sophia Antipolis Valbonne—France, Dec. 2013; 151 pages.
"3GPP TS 24.301 V14.0.1 (Jun. 2016) Technical Specification: 3rd Generation Partnership Project; Technical Specification Group Core Network and Terminals; Non-Access-Stratum (NAS) protocol for Evolved Packet System (EPS); Stage 3 (Release 14)," 3GPP, 650 Route des Lucioles—Sophia Antipolis Valbonne—France, Jun. 2016; 452 pages.
"3GPP TS 36.331 V13.2.0 (Jun. 2016) Technical Specification: 3rd Generation Partnership Project; Technical Specification Group Radio Access Network; Evolved Universal Terrestrial Radio Access (E-UTRA); Radio Resource Control (RRC); Protocol specification (Release 13)," 3GPP, 650 Route des Lucioles—Sophia Antipolis Valbonne—France, Jun. 2016; 623 pages.
International Search Report for Application No. PCT/US2017/032012 dated Aug. 21, 2017.

\* cited by examiner

100

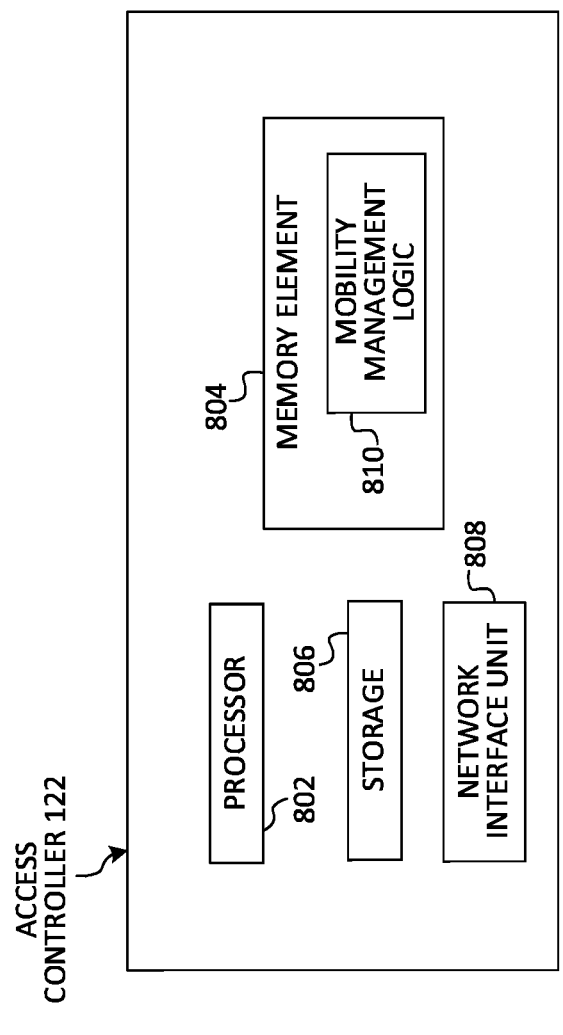

SYSTEM AND METHOD FOR OPTIMIZED IDLE AND ACTIVE STATE TRANSITIONS OF USER EQUIPMENT IN A NETWORK ENVIRONMENT

CROSS-REFERENCE TO RELATED APPLICATION

This application claims the benefit of priority under 35 U.S.C. § 119(e) to U.S. Provisional Application Ser. No. 62/337,174, entitled "SYSTEM AND METHOD TO FACILITATE OPTIMIZED IDLE AND ACTIVE STATE TRANSITIONS IN A NETWORK ENVIRONMENT," filed May 16, 2016.

TECHNICAL FIELD

This disclosure relates in general to the field of communications and, more particularly, to a system and method for optimized idle and active state transitions of user equipment in a network environment.

BACKGROUND

Networking architectures have grown increasingly complex in communication environments. As the number of mobile subscribers increases, efficient management of messaging and signaling communications between user equipment and core network resources becomes critical. Messaging communications can include data and control communications at the application level, whereas signaling communications typically involve control communications with the network providing connectivity for data services. Messaging and signaling interactions that occur when a user equipment transitions between idle and active mode can consume system resources that could otherwise be used to provide other services and/or improve user experience. When idle and active mode transitions occur across multiple user equipment service in a communication system, the compounded effects of such transitions can create network congestion and/or lead to suboptimal use of network resources. Accordingly, there are significant challenges in managing idle and active mode transitions of user equipment in a network environment.

BRIEF DESCRIPTION OF THE DRAWINGS

To provide a more complete understanding of the present disclosure and features and advantages thereof, reference is made to the following detailed description, taken in conjunction with the accompanying figures, wherein like reference numerals represent like parts, in which:

FIGS. 6-8 are simplified block diagrams illustrating example details that can be associated with various potential embodiments of the communication system.

DETAILED DESCRIPTION OF EXAMPLE EMBODIMENTS

Overview

Figure 1:
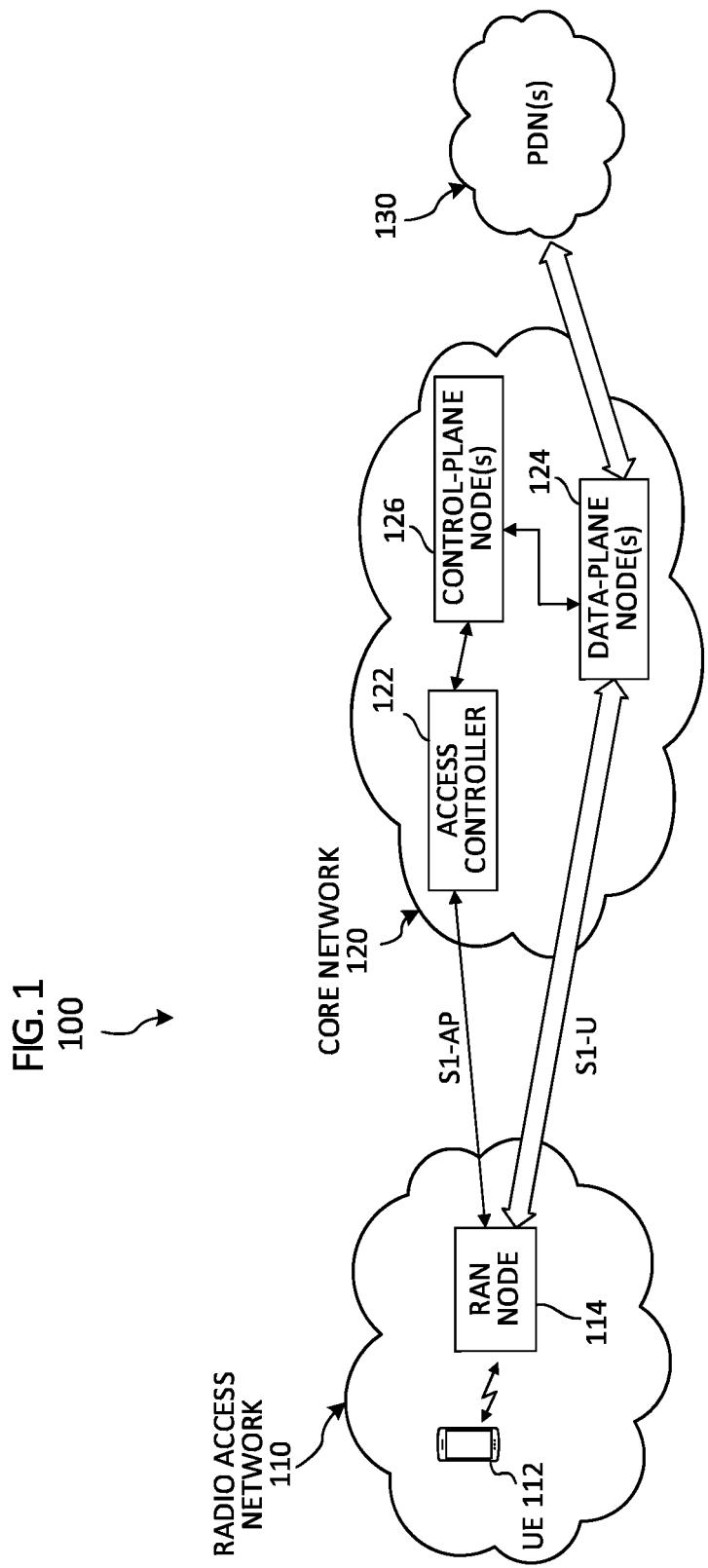
FIG. 1 is a simplified block diagram illustrating a communication system to facilitate optimized idle and active state transitions of user equipment in a network environment according to one embodiment of the present disclosure.

A method is provided in one example embodiment and may include determining that a user equipment (UE) is approximately stationary for a threshold period of time within a particular geographic area based, at least in part, on a radio access network (RAN) node to which the UE is attached; notifying the UE that the UE has been associated with the particular geographic area; and transitioning the UE into an idle mode from an active mode, wherein the transitioning is performed by the RAN node without notifying a core network that the UE has transitioned to the idle mode. In at least one instance, the method can further include storing context information for the UE at the RAN node when the UE transitions to the idle mode. In various instances, the particular geographic area can be associated with at least one of: an identity of the RAN node; and a cell identity for the RAN node.

In one instance, determining that the UE is approximately stationary can further include monitoring mobility signaling from the UE to determine an amount of time that the UE has been attached to the RAN node; and comparing the amount of time with the threshold period of time to determine when the amount of time is greater than or equal to the threshold period of time.

In some instances, the method can further include notifying the core network when the UE moves out of the particular geographic area. In some instances, the notifying can include notifying an access controller within the core network via Non-Access Stratum (NAS) signaling sent from the UE to the access controller.

In some cases, the method can further include transitioning the UE to an active state for at least one of: sending downlink data or signaling to the UE; and receiving uplink data or signaling from the UE. In at least one case, the transitioning can be performed without signaling the core network that the UE has been transitioned from the idle mode to the active mode. In at least one case, the transitioning includes only setting up radio bearers for the UE.

Example Embodiments

For purposes of understanding certain embodiments of systems and methods disclosed herein, it is important to appreciate the technologies and data that may be associated with network communications. The following foundational information may be viewed as a basis from which the present disclosure may be properly explained.

Architectures that facilitate network communications generally rely upon three basic components: a data-plane, a control-plane, and a management-plane. The data-plane carries user traffic, while the control-plane and the management-plane serve the data-plane. As referred to herein in this Specification, the term 'plane' can refer to a separation of traffic that can traverse a network. As referred to herein in this Specification, the terms 'user-plane', 'data-plane', 'user data-plane' and variations thereof can be used interchangeably.

In some architectures, Software Defined Network (SDN) concepts can be applied to control-plane and user plane elements or nodes in order to facilitate a split control and user-plane (split C/U-plane) architecture. Generally, SDN is an approach to building computer networks, networking equipment and software that separates and abstracts the control-plane and data-plane of networking systems. SDN decouples the control-plane elements or nodes that make decisions about where traffic is sent from the underlying data-plane elements or nodes that forward traffic to a selected destination. SDN allows network administrators, operators, etc. to manage network services through abstraction of lower level functionality into a virtualized network environment.

As referred to herein in this Specification, the terms 'virtual machine', 'virtualized network function', 'virtualized network functionality' and variations thereof can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), virtualized functionality and/or any virtualized network controller, module, node, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment.

In some cases, VNF(s) can be configured to perform one or more specialized operations within a network environment and one or more instances of the configured VNF(s) can be instantiated in order to execute the one or more specialized operations. In some instances, VNF(s) can include one of more virtualized network function components (VNFCs). In some embodiments, a VNFC can be an internal component of a VNF, which can provide a VNF provider a defined subset of that VNF's functionality via VNFC instantiation (VNFCI). In some embodiments, operations or functionality associated with a RAN and/or a core network can be configured to be executed via one or more VNFs and/or VNFCs and/or one or more Physical Network Functions (PNFs) to realize a virtualized RAN (vRAN) and/or a virtualized core network architecture. A PNF is typically associated with a hardware radio head, which can be configured with one or more transmitters and receivers (and other associated hardware and software functionality) in order to facilitate over-the-air (OTA) Radio Frequency (RF) communications with one or more user equipment (UE).

In many 3rd Generation Partnership Project (3GPP) architectures such as Long Term Evolution (LTE) architectures, transitions between idle and active modes by user equipment (UE) may arguably be the most frequently used procedure by UE attached to an LTE communication network. In some of the networks, it has been found that the Service Request procedure (e.g., transition from idle to active mode) is performed by each UE approximately every two minutes. Current processes for the Service Request procedure, as defined by 3GPP standards, are described in 3GPP Technical Specification (TS) 23.401, Section 5.3.4. In general, the current Service Request procedure includes the following signaling: paging a given UE over the radio interface; UE to Mobility Management Entity (MME) Non-Access Stratum (NAS) messaging for requesting radio resources by the UE; UE to evolved NodeB (eNB) Radio Resource Control (RRC) messaging for establishing the radio resources; MME to Serving Gateway (SGW) General Packet Radio Service (GPRS) Tunneling Protocol version 2 (GTPv2) messaging to inform the S1 user data-plane (S1U) tunnel endpoint identity (TEID) of the eNB to the SGW; and, in split C/U-plane architectures, SGW control-plane element (SGW-C) to SGW user data-plane element (SGW-U) messaging to program downlink data flows with the appropriate TEID of the eNB.

Any optimization in the Service Request procedure would likely lead to some gain in reducing one or more of the above messaging/signaling on a per-UE basis. Multiplying such a gain over the large number of UEs that are typically attached to a network and that can be performing the Service Request procedure approximately every two minutes would likely result in large signaling savings between the UE and core network and within the core network.

Moreover, in a split C/U-plane architecture, frequently altering a given UE's flow (e.g., when the UE becomes idle the flow is removed and then again when the UE becomes active a new flow is added) will likely place higher transaction per second (TPS) requirements over the interface between control- and user-plane elements or nodes and, in turn, it may lead to performance (e.g., throughput) deterioration in the forwarding (e.g., data) plane. Thus, reducing Service Request procedure messaging will also likely help in efficiently achieving split C/U-plane architectures.

Although it is desirable to keep a UE in an active mode, doing so is not possible as it would cause a UE battery drainage issue, it would result in radio resources potentially unnecessarily being reserved at the eNB to which the UE was attached and it would prevent the eNB to which the UE is connected from multiplexing radio resources among a large number of UEs. To summarize, the Service Request procedure to transition between idle and active mode cannot be alleviated. However, it is nonetheless desirable to minimize the signaling due to the Service Request procedure so as to make the procedure lighter (e.g., in terms of total number of messaging/signaling) as compared to the manner in which the current Service Request procedure is provided in current deployments. As referred to herein, the terms 'active mode', 'active state' and 'RRC active' mode or state can be used interchangeably and the terms 'idle mode', 'idle state' and 'RRC idle' mode or state can also be used interchangeably.

In accordance with at least one embodiment of the present disclosure, a communication system 100 as shown in FIG. 1 illustrates an architecture, which can overcome the aforementioned shortcomings (and others) by providing a system and method that can facilitate optimized idle and active state transitions of user equipment in a network environment. The architecture of communication system 100 shown in the embodiment of FIG. 1 includes a Radio Access Network (RAN) 110 including a RAN node 114, which can provide a communication interface to one or more users operating user equipment (UE) 112 and a core network (CN) 120, which can include an access controller 122, one or more data-plane node(s) 124 and one or more control-plane node(s) 126, and one or more packet data network(s) PDN(s) 130. The embodiment of FIG. 1 illustrates an example split C/U-plane architecture.

UE 112 can interface with RAN node 114 via an over-the-air (OTA) interface, such as, for example, a Radio Frequency (RF) interface. RAN node 114 can interface via a control-plane interface with access controller 122, which can interface via one or more control-plane interface(s) with one or more control-plane node(s) 126. The control-plane interface between RAN node 114 can be an S1 Application Protocol (S1-AP) interface. Control-plane node(s) 126 can further interface via one or more control-plane interface(s) with one or more data-plane node(s) 124. RAN node 114 can further interface via one or more data-plane interface(s) with one or more data-plane node(s) 124 via one or more S1 user-plane (S1-U) interfaces. One or more data-plane node(s) 124 can further interface with one or more PDN(s) 130. In various embodiments, one or more PDN(s) can include an internet, web server(s), enterprise network, an Internet Protocol (IP) Multimedia Subsystem (IMS), combinations thereof or the like.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communications in a network environment are referred to herein as 'messages', 'messaging' and/or 'signaling', which may be inclusive of packets. Generally, signaling is referred to in reference to control-plane packets while messaging can be referred to in reference to control-plane or data-plane packets exchanged for communications at the application level. A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data networks, such as, for example, PDN(s) 140. Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a service gateway interface (SGi), a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like.

During operation, in at least one embodiment, communication system 100 can be configured such that when UE 112 transitions into an idle mode, only radio resources (e.g., bearer(s)) for the UE are released while the RAN node 114 keeps S1-AP and S1-U sessions active for the UE as long as the UE stays within the RAN node's coverage area. The access controller 122 will not be notified of the UE's transition to idle mode. Subsequently, if downlink data for the UE arrives at the RAN node, only the radio resources (e.g., bearer(s)) will need to be reestablished while other messaging typically needed for the current Service Request procedure can be avoided. Thus, by reducing the overall messaging requirement of a Service Request (e.g., reducing the total number of messages needed for performing a Service Request), embodiments of the present disclosure provide a system and method for an optimized Service Request procedure that is light and efficient compared to the current Service Request procedure provided in 3GPP standards. Further, for split C/U-plane architectures, frequent modification of the UE's flow in the forwarding plane can be avoided for idle and active mode transitions.

At a minimum, a default bearer, as defined in 3GPP standards, is established for a given UE upon initial attachment of the UE to a given RAN node. In some instances, one or more dedicated bearers can be established for a given UE for one or more specialized services or applications provided to the UE such as, for example, a Voice over LTE (VoLTE) session, a data session, a Voice over IP (VoIP) session, a gaming session, a video session, combinations thereof or the like. In general, a bearer for a given UE is associated with the following information and/or parameters within the EPC: 1) an IP address for the UE, which can be allocated from a pool of IP addresses via Dynamic Host Configuration Protocol (DHCP), Stateless Address Auto-configuration (SLAAC), etc.; 2) an IP address for an EPC node for a given PDN connection for the UE; and 3) at least one GTP user-plane (GTP-U) bearer tunnel extending between a PGW/PGW-U and a SGW/SGW-U and at least one GTP-U bearer tunnel extending from the SGW/SGW-U to the RAN node to which the UE is connected (e.g., if the UE is in a CONNECTED mode or state). In LTE architectures, a bearer can be identified using an EPS Bearer Identity (EBI).

To facilitate optimized idle and active mode transitions for the optimized Service Request procedure provided by embodiments discussed herein, it is beneficial to consider the general behavior of a given UE (e.g., the behavior of the human user/subscriber associated with the given UE). In general, a UE/subscriber exhibits peculiar cycles, which can include, but not be limited to: 'mobile', 'stationary and consuming data' or 'approximately stationary and consuming data', and 'mobile' again.

For example, consider that a person travels to an office (e.g., is mobile) and then consumes data at the office (e.g., is approximately stationary and consuming data), the person travels from the office to a home (e.g., is mobile again) and then consumes data (e.g., is stationary again and consuming data), a person goes to a restaurant (e.g., is mobile) and spends most of the evening in a vicinity of the restaurant and consumes data (e.g., is approximately stationary and consuming data), a person goes to a shopping mall, sporting event, arena, etc. and spends an extended period of time involved in various activities in a vicinity of the mall, event, arena, etc. and consumes data during this time (e.g., is approximately stationary and consuming data). Thus, in general, with the exception for cases in which human subscribers are consuming data on a moving train, bus, plane, etc., subscribers are often consuming data while stationary. The terms 'stationary' or 'approximately stationary', as referred to herein, are meant to refer to a UE that: remains within the coverage area of a particular RAN node, remains within an area covered by one or more cells provided by a particular RAN node and/or remains within an area covered by multiple specific RAN nodes and/or multiple cells of multiple specific RAN nodes for a certain threshold period of time.

Although a UE, when connected to the core network 120 can assumed to be under the coverage of "some" RAN node, a determination of stationary or approximately stationary can be determined based on the UE remaining in a particular area of a particular RAN node, RAN nodes, cell areas, etc. as noted above, for a certain threshold period of time. In various embodiments, a threshold period of time that can be used to determine whether a UE is stationary/approximately stationary or non-stationary can include a number of minutes, hours, days, combinations thereof or the like, as configured by a network operator or service provider.

For stationary or approximately stationary UEs, it is possible to reach them for delivery of downlink data by first paging the last cell identifier (ID) reported by the UE to avoid paging in a wider area to find the UE. An optimized Service Request procedure can be provided based on such a paging principle.

Consider an operational example involving UE 112. During operation, in at least one embodiment, the network (e.g., the RAN node, access controller, combinations thereof or the like) can monitor the UE's location for a duration of time, which can be compared against a threshold period of time that can be set to indicate when a UE is stationary or approximately stationary. If the monitored duration of time for a given UE within a particular geographic area is greater than or equal to a given threshold period of time, the network can determine that the UE is stationary or approximately stationary for the particular geographic area.

In various embodiments, a UE's location can be determined based on location updates or other mobility signaling received from the UE such as, for example, Tracking Area Update (TAU) or the like sent to access controller 122 via the RAN node to which the UE is attached. If the UE's location is determined to be stationary or approximately stationary for a specific geographic area identified by one or more cell-ID(s) and/or one or more eNB-ID(s) for one or more RAN node(s) then the UE can be 'pinned' to the geographic area by the access controller and the UE can be informed that it has been pinned to the geographic area. By 'pinned' it is meant that an association can be stored for the UE and the specific geographic area that links the UE to the cell-ID(s)/eNB-ID(s) for the specific geographic area in which the UE is determined to be stationary or approximately stationary. As referred to herein, information and/or parameters corresponding to the association of a UE to one or more cell-ID(s) and/or eNB-ID(s) can be referred to as 'pinned area information'.

In various embodiments, cell-ID can include an Evolved Universal Terrestrial Radio Access Network (E-UTRAN) Cell Global Identifier (ECGI) or the like as defined in 3GPP standards. In various embodiments, eNB-ID can include a global identifier such as Global eNB-ID or Global HeNB-ID (e.g., for small cell deployments in which Home eNBs (HeNBs) are deployed).

A UE can be informed that it has been pinned to a geographic area by the RAN node to which it is attached or by the access controller 122. In one embodiment, for example, when a given UE (e.g., UE 112) moves from active to idle mode when the idle time expires at a given RAN node (e.g., RAN node 114), the UE can be informed by the RAN node that it has been pinned to one or more cell-ID(s)/eNB-ID(s). In another embodiment, a UE can be informed via pinned area information that it has been pinned to the one or more cell-ID(s)/eNB-ID(s) by an access controller (e.g., access controller 122) in response to the access controller receiving mobility signaling (e.g., TAU, Service Request, etc.) from the UE. In some embodiments, TAU Accept messaging can be enhanced to carry pinned area information to UE. In other embodiments, new mobility messaging can be defined (e.g., for 4G or 5G deployments) to carry pinned area information to UE.

If a UE moves out of its current geographic area identified by one or more cell-ID(s)/eNB-ID(s) (e.g., its pinned area) in idle mode, then the UE has to inform the network via signaling that is has moved out of its pinned area. In one embodiment, TAU Request messaging can be enhanced to carry an indication that a UE has transitioned from its pinned area. In another embodiment, new mobility messaging (for 4G or 5G deployments) can be defined to carry an indication that a UE has transitioned from its pinned area.

While a given UE remains in its pinned area the RAN node to which it is attached can maintain the S1-AP (e.g., access stratum) and S1-U context for the given UE. Thus, from the perspective of the core network 120, the UE can be considered as in the active mode. In various embodiments, UE context can include security context, authentication context, combinations thereof or the like.

Consider an operational example involving UE 112. If, for example, downlink data or control-plane signaling from the access controller 122 for the UE arrives at the RAN node 114, then the RAN node can page the UE (if the radio resources are released) passing an indication to 'only establish the radio resources' for the UE (e.g., to execute the radio resource establishment part of the Service Request procedure) rather than the initiating a full Service Request procedure for the UE.

Radio resources for the UE can then be established and the existing S1-AP and S1-U context can be used for transferring downlink and/or uplink control messages and data packets to/from the UE. The radio resources for the UE can also be established if the UE initiates Service Request procedure. Thus, optimized Service Request procedure can be achieved via communication system 100 in accordance with at least one embodiment.

Say, for example, that UE 112 is pinned to a particular geographic area and moves out of the pinned area in idle mode. In such a case, when the UE moves out of its pinned area in idle mode it can inform the core network 120 nodes that it has moved out of its pinned area. In various embodiments, a given UE can inform an access controller (e.g., access controller 122) and the RAN node (e.g., RAN node 114) to which it was attached that it has moved out of a pinned area using an enhanced TAU which can be modified to include a reason or cause code identifying that the UE has moved out of its pinned area. In some embodiments, a new message can be defined such as, for example, a Pinned Area Update (PAU), which can be used to signal to an access controller that a given UE has moved out of its pinned area. For the operational example involving UE 112, upon determining that the UE has moved out of the pinned area, the RAN node 114 releases the S1-AP and S1-U context (e.g., using the S1 release procedure as currently defined in 3GPP specifications) for the UE so that the UE can be considered as in idle mode from the core network perspective.

Thus, the system and method provided communication system 100 can provide several advantages in various embodiments. For example, the system and method can provide optimizations in which reduced UE to RAN node signaling is needed during idle and active mode transition procedures when a given UE is within a pinned area, no RAN node to data-plane node signaling is needed when a given UE is within a pinned area, and/or no SGW-C to SGW-U is needed when a given UE is within a pinned area (e.g., for a split C/U-plane architecture).

In summary, a signaling savings can be realized within the core network and between UE and the core network due to frequent idle and active mode transition without changing the frequency of idle and active transitions in accordance with various embodiments of communication system 100. Moreover, the system and method provided by communication system 100 can reduces the SGW-C to SGW-U signaling requirement, which can help in building efficient split C/U-plane architectures.

Although not shown in FIG. 1, each of the element or node of communication system 100 can include at least one processor, at least one memory element and at least one storage, as discussed in further detail herein. Further, aside from UE 112, any of the other elements or nodes of communication system 100 can be deployed as a physical hardware element or node or as a virtualized element or node. It should be understood that virtualized elements or nodes can be deployed in a SDN and/or Network Function Virtualization (NFV) architecture. As discussed herein, SDN/NFV allows network administrators, operators, etc. to manage network services through abstraction of lower level functionality into a virtualized network environment.

In general, RAN 110 may provide a communications interface between UE 112, one or more elements and/or nodes of core network 120 and one or more PDNs 130 for one or more 3GPP and/or non-3GPP access networks. In various embodiments, 3GPP access networks can include an LTE access network such as E-UTRAN, generally referred to as 4G or LTE/LTE-Advanced (LTE-A) and/or a 3GPP 5G access network. In various embodiments, non-3GPP access networks can include wireless local area networks (WLANs), such as Institute of Electrical and Electronic Engineers (IEEE) 802.11 Wi-Fi networks, Worldwide Interoperability for Microwave Access (WiMAX) networks, Bluetooth™ networks, combinations thereof or the like.

In various embodiments, UE 112 can be associated with any users, subscribers, employees, clients, customers, electronic devices, etc. wishing to initiate a flow in communication system 100 via some network. In at least one embodiment, UE 112 is configured to facilitate simultaneous Wi-Fi connectivity and cellular connectivity within communication system 100. The terms 'user equipment', 'mobile node', 'mobile station' or 'mobile device' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 100. UE 112 may also be inclusive of a suitable interface to a human user such as a microphone, a display, a keyboard, or other terminal equipment. As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions.

UE 112 may also be any device that seeks to initiate a communication on behalf of another entity or element such as a program, a database, or any other component, device, element, or object capable of initiating an exchange within communication system 100. In certain embodiments, UE 112 may have a bundled subscription for network access and application services (e.g., voice), etc. In one embodiment, once the access session is established, the user can register for application services as well, without additional authentication requirements. Within communication system 100, IP addresses (e.g., for UE or any other element in communication system 100) can be assigned using DHCP, SLAAC, during default bearer activation processes, or any suitable variation thereof. IP addresses used within communication system 100 can include IP version 4 (IPv4) and/or IP version 6 (IPv6) IP addresses.

In various embodiments, RAN node 114 can be deployed as an eNB or HeNB (e.g., for 4G/LTE deployments), as a 5G radio node, combinations thereof or the like. In various embodiments, access controller 122 can be deployed as an MME (e.g., for 4G/LTE deployments) or as a similarly configured access control element for a 5G deployment. In various embodiments, an MME or access controller can, in addition to the features discussed for embodiments described herein, provide for UE tracking and paging procedures including, for example, retransmissions, tracking area list management, idle mode UE tracking, etc. An MME or access controller can further provide for UE bearer procedures including activation, deactivation and modification, SGW/SGW-U and PGW/PGW-U selection for UE and authentication services.

In various embodiments, data-plane node(s) 124 can include one or more SGWs and/or PDN Gateways (PGWs), Service Architecture Evolution (SAE) gateways, one or more SGW-Us, PGW-Us and/or one or more combined S/P-GW-Us, for split C/U plane architectures, such as shown in the embodiment of FIG. 1. In various embodiments control-plane node(s) 126 can include one or more SGW-Cs, one or more PGW-Cs and/or one or more combined S/P-GW-Cs for split C/U plane architectures, such as shown in the embodiment of FIG. 1. In general, An SGW or SGW-U is a data-plane element that can provide functionality for managing user mobility and interfaces with RAN nodes (e.g., eNBs, HeNBs, etc.). An SGW or SGW-U service function can also maintain data paths between RAN nodes and PGW(s) or PGW-U(s). A PGW or PGW-U service function typically provides IP connectivity access network (IP-CAN) session connectivity for UEs to one or more external PDN(s) (e.g., PDN(s) 130).

In various embodiments, core network 120 can include one or more other elements, including, but not limited to: one or more Policy and Charging Rules Functions (PCRFs), one or more 3GPP AAA elements, one or more Home Subscriber Servers (HSS), one or more SGW-Cs, one or more PGW-Cs (e.g., for split C/U-plane architectures) combinations thereof or any other elements or nodes as may be defined by 3GPP, Internet Engineering Task Force (IETF), or similar organization.

Figure 2:
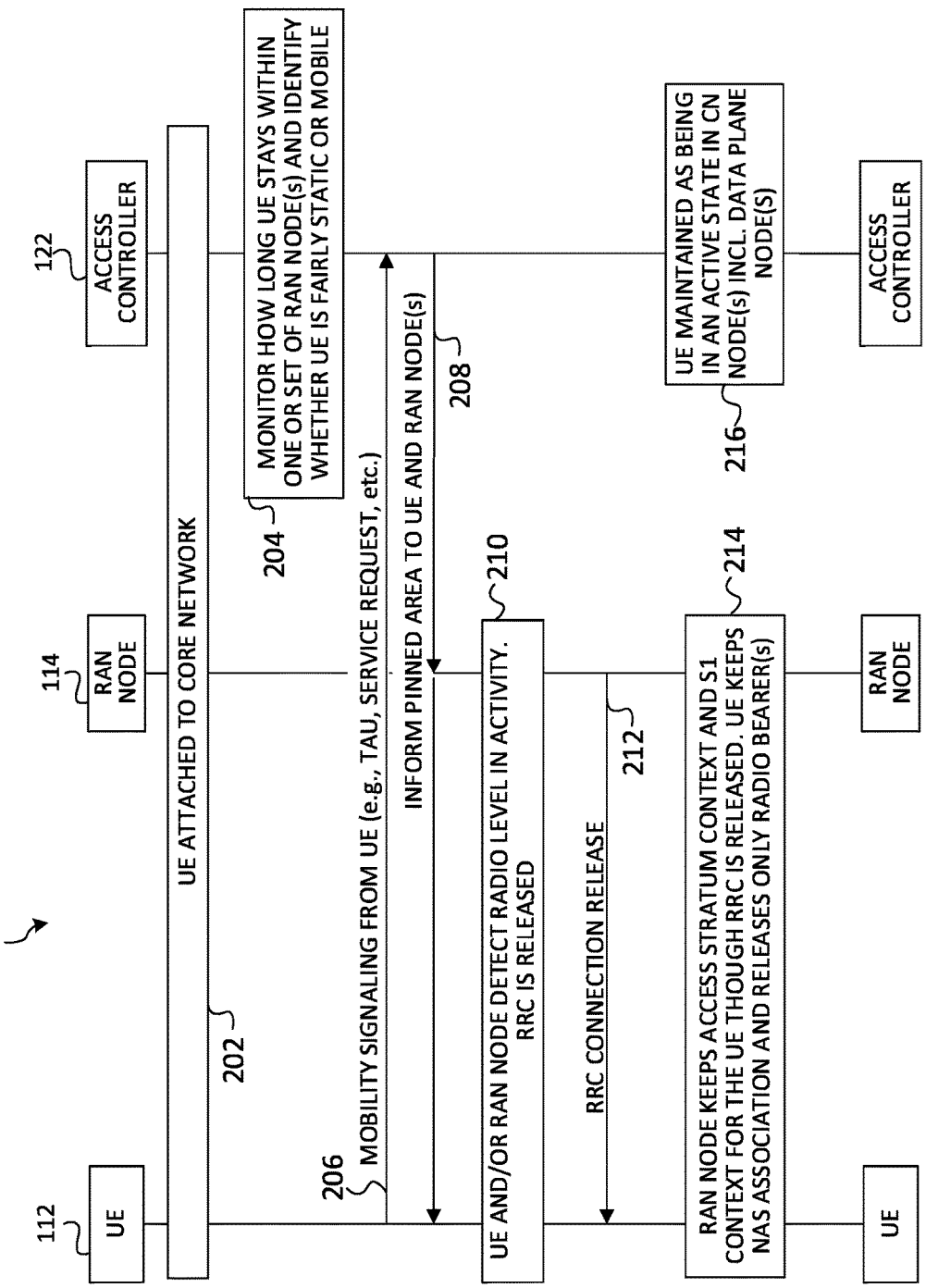
FIG. 2 is a simplified interaction diagram illustrating example details that can be associated with optimizing idle and active state transitions of user equipment in a network environment in accordance with one potential embodiment.

Referring to FIG. 2, FIG. 2 is a simplified interaction diagram 200 illustrating example details that can be associated with facilitating optimized idle and active state transitions in a network environment in accordance with one potential embodiment of communication system 100. FIG. 2 includes UE 112, RAN node 114 and access controller 122. As shown in the embodiment of FIG. 2, once the UE is attached to the core network 120 via RAN node 114 at 202, access controller 122 can monitor at 204 (e.g., based on mobility messaging received from the UE) how long the UE stays within an area of one or a set of RAN node(s) in order to identify whether the UE is relatively static (e.g., stationary or approximately stationary) or mobile.

Upon determining that the UE is stationary, the access controller can inform the UE and the RAN node(s) that the UE has been pinned to a given pinned area. For the embodiment shown in FIG. 2, the access controller 122 can, in at least one embodiment, receive mobility signaling from the UE at 206 and can inform pinned area information for the pinned area to UE 112 and RAN node 114 at 208. In some embodiments, an access controller (e.g., access controller 122) can inform a UE that it has been pinned to an area using TAU Accept messaging that is enhanced to carry pinned area information to UE. In other embodiments, new mobility messaging can be defined (e.g., for 4G or 5G deployments) to carry pinned area information to UE.

It is assumed for the embodiment shown in FIG. 2 that after a period of time, the UE and/or RAN node(s) can detect radio level inactivity for the UE at 210 and RRC is released for the UE via an RRC Connection release at 212. The RAN node 114 keeps the access stratum (AS) and S1 context for the UE even though the RRC is released and the UE keeps its NAS association and releases only radio bearers as shown at 214. For the core network (CN) node(s) (e.g., access controller 122, data-plane node(s) 124, control-plane node(s) 126), the UE mode is maintained as being in an active state as shown at 216.

Figure 3:
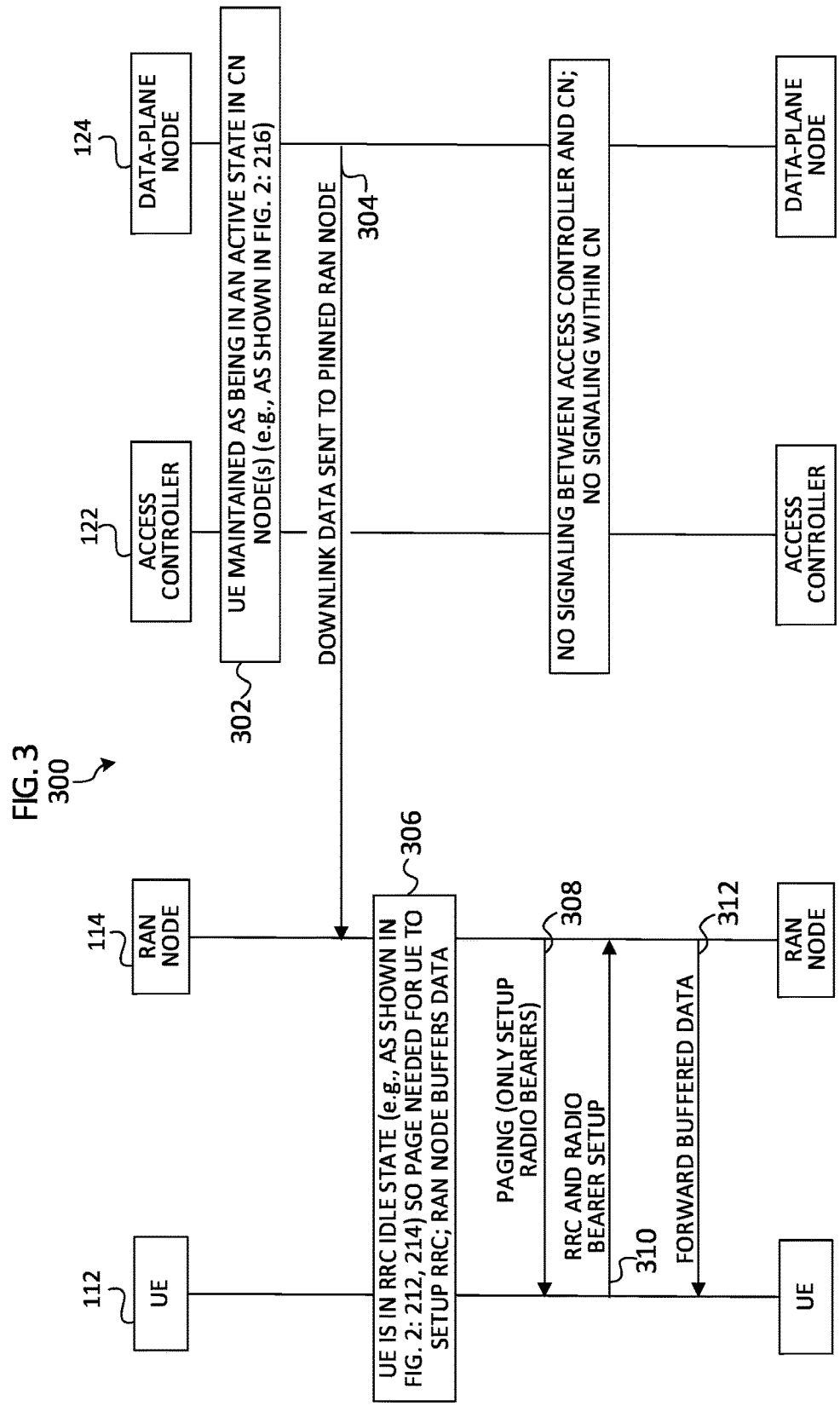
FIG. 3 is a simplified interaction diagram illustrating other example details that can be associated with optimizing idle and active state transitions of user equipment in a network environment in accordance with one potential embodiment.

Referring to FIG. 3, FIG. 3 is a simplified interaction diagram 300 illustrating example details that can be associated with sending downlink data to UE 112 when the UE is in an RRC idle mode while the core network 122 has associated the UE with being in an active mode in accordance with one potential embodiment of communication system 100. FIG. 3 includes UE 112, RAN node 114, access controller 122 and a particular data-plane node 124. The embodiment of FIG. 3 is assumed to follow from the interactions shown in FIG. 2 in which the UE is maintained as being in an active state in the CN node(s) at 302.

For the embodiment of FIG. 3, it is assumed that downlink data is sent at 304 from data-plane node 124 to the pinned RAN node 114. Upon reaching the RAN node 114, the RAN node determines at 306 that the UE is in an RRC idle state and that a page is needed for the UE to set up radio bearers for the UE. RAN node 114 also buffers the data at 306 until the UE is transitioned into an active state. At 308, the RAN node 114 pages the UE 112 and includes in the paging an indication that the UE is to only setup radio bearer(s) in response to the paging. At 310, the UE performs its RRC procedures, as defined in 3GPP TS 36.331, Section 5.3.3, and sets up radio bearer(s) with the RAN node 114. Once bearer(s) setup is completed, the buffered data is forwarded to the UE from the RAN node 114 at 312.

Figure 4:
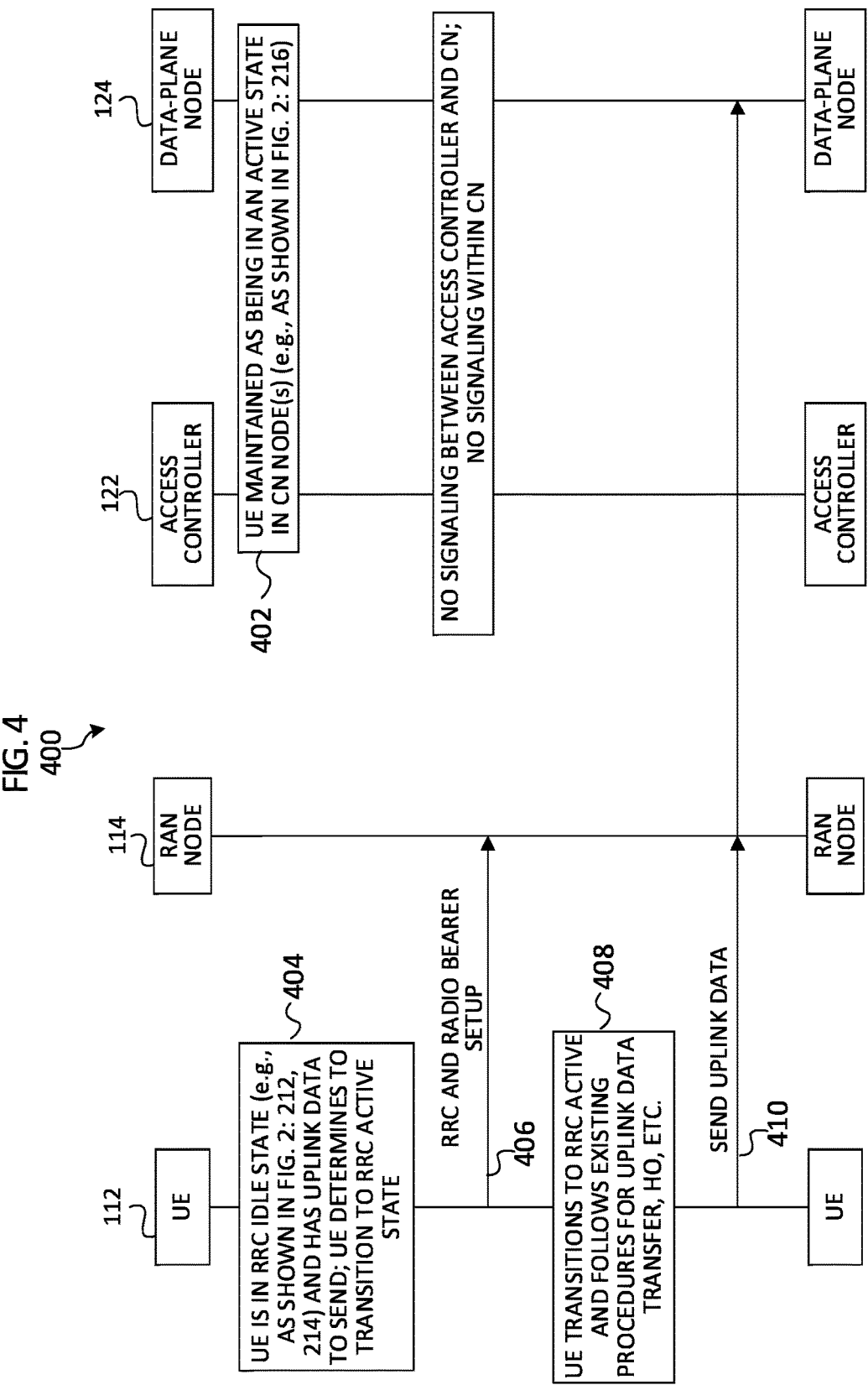
FIG. 4 is a simplified interaction diagram illustrating yet other example details that can be associated with optimizing idle and active state transitions of user equipment in a network environment in accordance with one potential embodiment.

Referring to FIG. 4, FIG. 4 is a simplified interaction diagram 400 illustrating example details that can be associated with UE 112 shifting to an RRC active state when the UE desires to send uplink data to RAN node 114 and/or a core network node or element in accordance with one potential embodiment of communication system 100. FIG. 4 includes UE 112, RAN node 114, access controller 122 and a particular data-plane node 124. The embodiment of FIG. 4 is assumed to follow from the interactions shown in FIG. 2 in which the UE is maintained as being in an RRC active state in the CN node(s) at 402 while the UE is actually in an RRC idle state from the perspective of RAN node 114. At 404, it is assumed that the UE has uplink data to send and determines to transition to an RRC active state.

At 406, RRC procedures, as defined in 3GPP TS 36.331, Section 5.3.3, are carried out between the UE and the RAN node to setup bearer(s) for the UE without additional signaling between the access controller 122 and the core network and/or within the core network itself (e.g., with one or more data- and/or control-plane node(s)). At 408, the UE 112 transitions to an RRC active state and follows existing 3GPP procedures for performing uplink data transfers, handover (HO), etc. For the embodiment shown in FIG. 4, uplink data for the UE 112 is sent to data-plane node 124 via RAN node 114 as shown at 410.

Thus, as shown in the embodiments illustrated in FIGS. 2, 3 and 4, the system and method provided by communication system 100 can, overall, reduce the total number of messages exchanged during the radio resource release (e.g., transition to idle mode) and Service Request (e.g., transition to active mode) procedures, which can take place around every 2 mins per UE. This optimization can further help in achieving efficient split C/U-plane architectures.

One current solution is defined in 3GPP standards for optimizing idle and active mode transitions for cellular Internet of Things (CIoT) technology. Current CIoT procedures are outlined in 3GPP TS 23.401, Sections 5.3.4A and 5.3.5A. In general, procedures for CIoT provide that when there is radio inactivity for a given UE, the given UE sends a RRC suspend to the eNB to which it is connected. The eNB maintains the Access Stratum context for the UE. However, the eNB sends an explicit S1 signaling (S1AP UE Context Suspend Request) to the MME when the UE sends its RRC suspend to the eNB and the MME sends an explicit Release Access Bearer Signaling to SGW. When the UE wants to resume data transmission, it sends an RRC Resume to the eNB, the eNB sends an explicit signaling (S1AP UE Context Resume Request) to the MME and the MME sends Modify Bearer Request to SGW. Thus, the net effect of the current CIoT solution only provides a savings in time that is taken between a UE service request and radio bearer setup but there is no savings in signaling messages with core network.

Embodiments of communication system 100 can provide for a reduced total number of messaging for idle to active transitions in comparison to the current CIoT solution provided in 3GPP standards. For example, as shown in the embodiment of FIG. 2, the number of signaling messages between the RAN node and the access controller for an RRC release is zero; whereas for the current 3GPP CIoT solution, the number of signaling messages is two involving an S1-AP UE Context Suspend Request and Response. Further, the number of signaling messages between the access controller and a mobility user plane anchor (e.g., in which data plane node 124 is an SGW/SGW-U) for an RRC release is zero; whereas for the current CIoT solution, the number of signaling messages is two involving a Release Access Bearer Request and Response with the SGW.

In another example, consider the embodiment shown in FIG. 3 involving downlink data to be sent to a UE when the UE is in an idle state from the perspective of the RAN node and is maintained as being in an active state from the perspective of the core network node(s). For the embodiment shown in FIG. 3, the RAN node initiates paging to the UE; whereas, for the current 3GPP CIoT solution the access controller initiates paging. Further, the response to the paging for the solution provided by communication system 100 is only RRC and radio bearer(s) setup with the core network node(s) being unaffected; whereas, for the current 3GPP solution, an RRC resume procedure is needed involving an S1-AP UE Context Resume Request and Response with the access controller and a Modify Bearer Request and Response between the access controller and the SGW.

Figure 5:
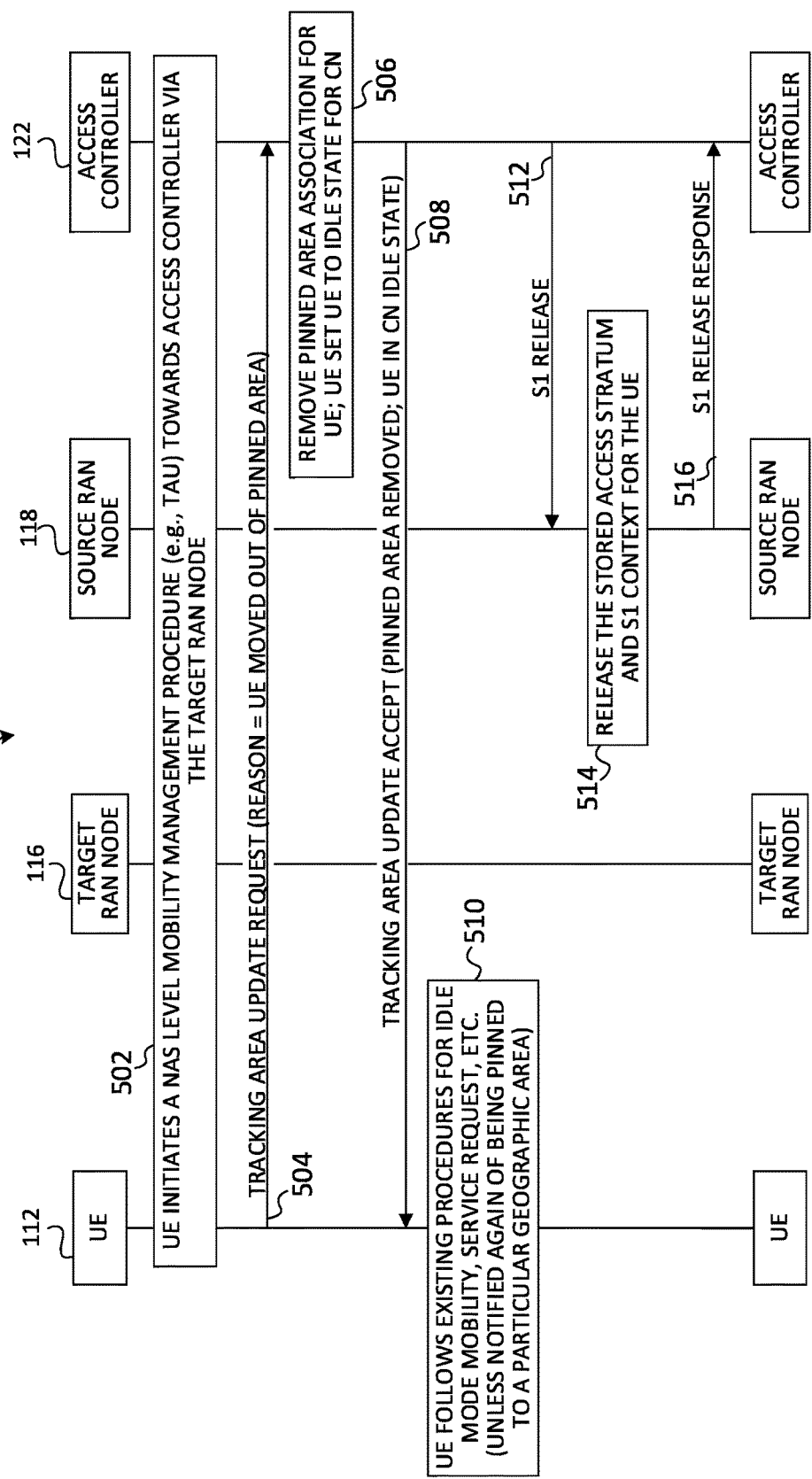
FIG. 5 is a simplified interaction diagram illustrating yet other example details that can be associated with optimizing idle and active state transitions of user equipment in a network environment in accordance with one potential embodiment.

Referring to FIG. 5, FIG. 5 is a simplified interaction diagram 500 illustrating example details that can be associated with UE 112 moving out of a given pinned area in accordance with one potential embodiment of communication system 100. FIG. 5 includes UE 112, a source RAN node 116, a target RAN node 118 and access controller 122. Source RAN node 116 and target RAN node 118 can be other RAN nodes deployed within RAN 110.

As shown in the embodiment of FIG. 5, the UE 112 can initiate a NAS level mobility management procedure (e.g., TAU or the like) towards access controller 122 via target RAN node 118 when the UE moves out of the coverage area of source RAN node 116 into the coverage area of target RAN node 118 at 502 to perform a handover (HO) to the target RAN node. For the embodiment of FIG. 5, the UE initiates a TAU Request toward access controller 122 at 504. The TAU can include a 'reason' indicator that indicates the UE has moved out of its pinned area. In one embodiment, a TAU Request message can be enhanced to carry such a reason indicator as a bit or flag set for a particular Information Element (IE) within the message, which the access controller can parse to determine that the reason for the TAU Request is because a given UE has moved out of its pinned area.

At 506, the access controller parses the reason indicator for the TAU Request message, removes the pinned area association for the UE and sets the UE as being in an idle state for the perspective of the core network (CN) 120. At 508, the access controller sends a TAU Accept message to the UE 112 including an indication that the pinned area has been removed for the UE. Although TAU Request/Accept messages are shown in the embodiment of FIG. 5, it should be understood that any mobility messaging (existing or new) for 4G and/or 5G deployments can be configured to facilitate communicating pinned area transitions when a UE is in idle mode.

At 510, the UE can follow existing 3GPP procedures for idle mode mobility procedures, Service Request procedures, etc. unless the UE is again notified of being pinned to a particular geographic area, in which case the enhanced Service Request procedures, as discussed for various embodiments described herein can be carried out. At 512, the access controller 122 initiates an S1 release towards the source RAN node 116. At 514, the source RAN node 116 releases the stored access stratum and S1 context for the UE and, at 516, sends the access controller 122 an indication of the context release in an S1 release response.

The embodiment shown in FIG. 5 also differs from the current 3GPP CIoT solution described in 3GPP TS 23.401. In particular, the optimizations provided via communication system 100 provide for a new pinned area update procedure (e.g., using either an enhance TAU procedure or a new PAU procedure) when a given UE determines that it has left its pinned area, in which case the access controller tears down the saved access stratum and S1 context for the UE in the old RAN node. For the current 3GPP CIoT solution, access stratum and S1 context for a given UE are suspended and transferred between RAN nodes across an X2 interface. Accordingly, there are several differences between the solution provided by communication system 100 and the current 3GPP CIoT solution.

Figure 6:
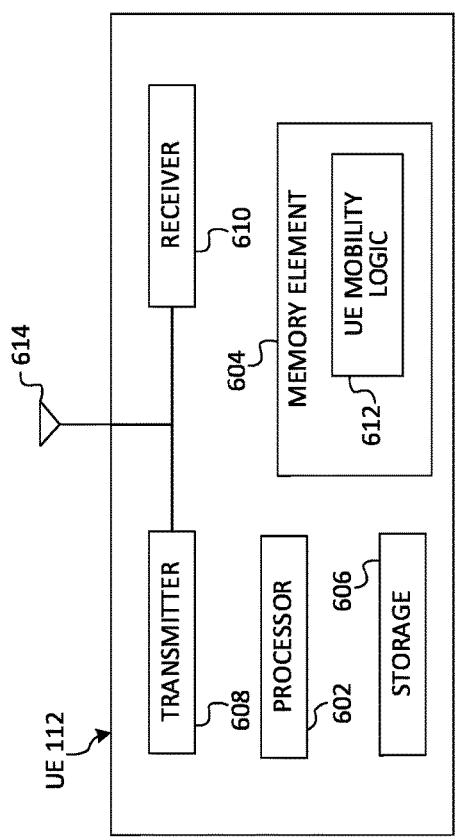

Referring to FIG. 6, FIG. 6 is a simplified block diagram illustrating example details that can be associated with UE 112 in accordance with one potential embodiment of communication system 100. UE 112 can include at least one processor 602, at least one memory element 604, a storage 606, at least one transmitter 608, at least one receiver 610 and at least one antenna 614. At least one memory element 604 can include instructions for UE mobility logic 612.

In at least one embodiment, at least one processor 602 is at least one hardware processor configured to execute various tasks, operations and/or functions of UE 112 as described herein and at least one memory element 604 is configured to store data, information, software and/or instructions associated with UE 112 and logic configured for memory element 604. In various embodiments, storage 606 for UE 112 can be configured to store information and/or parameters associated with various operations as described herein including, but not limited to, storing pinned area information such as one or more cell-ID(s) and/or eNB-ID(s) received from a given access controller (e.g., access controller 122) via a given RAN node to which the UE is attached (e.g., RAN node 114) and/or storing any other information and/or parameters as discussed herein. In at least one embodiment, at least one transmitter 608, at least one receiver 610 and at least one antenna 614 can operate in combination and/or with one or more other elements of UE 112 to facilitate over the air communications with one or more RAN node(s) for various operations as described herein.

In at least one embodiment, UE mobility logic 612 can include instructions that, when executed by at least one processor 602, cause UE 112 to perform one or more operations including, but not limited to: recognizing when the UE has been pinned to a particular geographic area identified by one or more cell-ID(s) and/or eNB-ID(s); recognizing when the UE moves out of a particular geographic area; initiating tracking area update procedures or other mobility procedures (e.g., pinned area update procedures) towards an access controller when the UE moves out of a particular geographic area in an idle state in which the update procedures can include a reason for the update; setting up only radio resources (e.g., radio bearer(s)) in response to transitioning from an idle to active mode for the optimizations described herein; combinations thereof or any other operations described for various embodiments discussed herein.

Figure 7:
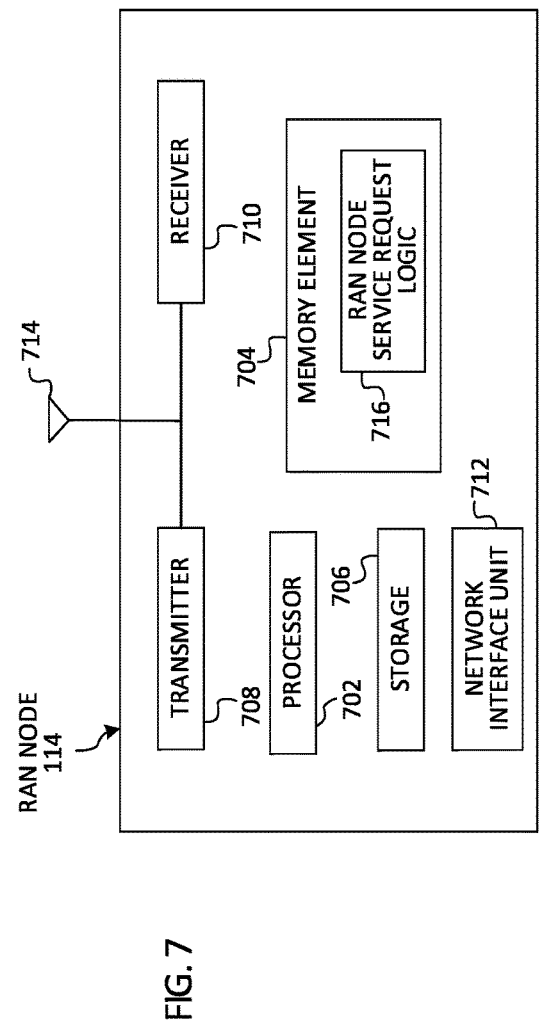

Referring to FIG. 7, FIG. 7 is a simplified block diagram illustrating example details that can be associated with RAN node 114 in accordance with one potential embodiment of communication system 100. RAN node 114 can include at least one processor 702, at least one memory element 704, a storage 706, at least one transmitter 708, at least one receiver 710, a network interface unit 712 and at least one antenna 714. At least one memory element 704 can include instructions for RAN node service request logic 716.

In at least one embodiment, at least one processor 702 is at least one hardware processor configured to execute various tasks, operations and/or functions of RAN node 114 as described herein and at least one memory element 704 is configured to store data, information, software and/or instructions associated with RAN node 114 and logic configured for memory element 704. In various embodiments, storage 706 for RAN node 114 can be configured to store information and/or parameters associated with various operations as described herein including, but not limited to, storing pinned area information such as one or more cell-ID(s) and/or eNB-ID(s) received from a given access controller (e.g., access controller 122) for a given UE (e.g., UE 112) that is attached to the RAN node; storing access stratum (AS) and S1 context information for a given UE pinned to a particular geographic area that has transitioned to an idle state; and/or storing any other information and/or parameters as discussed herein. In at least one embodiment, at least one transmitter 708, at least one receiver 710 and at least one antenna 714 can operate in combination and/or with one or more other elements of RAN node 114 to facilitate over the air communications with one or more UE for various operations as described herein.

In various embodiments, network interface unit 712 enables communication between RAN node 114, access controller 122, one or more data-plane node(s) 124, and/or any other RAN nodes (e.g., via a 3GPP X2 or similar interface) that may be configured for communication system 100. In some embodiments, network interface unit 712 can be configured with one or more Ethernet driver(s) and/or controller(s) or other similar network interface driver(s) and/or controller(s) to enable communications for RAN node 114 within communication system 100.

In at least one embodiment, RAN node service request logic 716 can include instructions that, when executed by at least one processor 702, cause RAN node 114 to perform one or more operations including, but not limited to: storing pinned area information for a UE attached to the RAN node; recognizing when a UE has been pinned to a particular geographic area identified by one or more cell-ID(s) and/or eNB-ID(s) and determining to store AS and S1 context information for the UE when it is transitioned to an idle state; determining to not perform signaling with core network node(s) (e.g., access controller 122) when a pinned UE is transitioned to an idle state or an active state; combinations thereof or any other operations described for various embodiments discussed herein.

Referring to FIG. 8, FIG. 8 is a simplified block diagram illustrating example details that can be associated with access controller 122 in accordance with one potential embodiment of communication system 100. Access controller 122 can include at least one processor 802, at least one memory element 804, a storage 806, and a network interface unit 808. At least one memory element 804 can include instructions for mobility management logic 810.

In at least one embodiment, at least one processor 802 is at least one hardware processor configured to execute various tasks, operations and/or functions of access controller 122 as described herein and at least one memory element 804 is configured to store data, information, software and/or instructions associated with access controller 122 and logic configured for memory element 804. In various embodiments, storage 806 for access controller 122 can be configured to store information and/or parameters associated with various operations as described herein including, but not limited to, storing geographic area information for one or more geographic area(s) that can each be identified by one or more cell-ID(s) and/or eNB-ID(s); storing threshold time period information that can be used in making pinned area determinations for one or more UE for one or more geographic area(s); storing pinned area information for one or more UE and/or storing any other information and/or parameters as discussed herein.

In various embodiments, network interface unit 808 enables communication between access controller 122, one or more RAN node(s) (e.g., RAN node 114), one or more control-plane node(s) 126, one or more data-plane node(s) 124, and/or any other elements or nodes that may be configured for communication system 100. In some embodiments, network interface unit 808 can be configured with one or more Ethernet driver(s) and/or controller(s) or other similar network interface driver(s) and/or controller(s) to enable communications for RAN node 114 within communication system 100.

In at least one embodiment, mobility management logic 810 can include instructions that, when executed by at least one processor 802, cause access controller 122 to perform one or more operations including, but not limited to: determining that a given UE is stationary or approximately stationary in a particular geographic area identified by one or more cell-ID(s) and/or eNB-ID(s); storing pinned area information for one or more UE (e.g., UE 112); performing mobility signaling with one or more UE (e.g., informing UE that they have been pinned to an area via an enhanced TAU Accept message or the like including such an indication); performing context release procedures; combinations thereof or any other operations described for various embodiments discussed herein.

In regards to the internal structure associated with communication system 100, each of data-plane node(s) 124, control-plane node(s) 126, source RAN node 116, and target RAN node 118 may each also include a respective at least one processor, a respective at least one memory element and/or a respective at least one respective storage. Hence, appropriate software, hardware and/or algorithms are being provisioned in each of UE 112, RAN node 114, access controller 122, data-plane node(s) 124, control-plane node(s) 126, source RAN node 116, and target RAN node 118 in order to facilitate various operations as described for various embodiments discussed herein to facilitate optimized idle and active state transitions in a network environment. Note that in certain examples, certain databases or storage (e.g., for storing information associated with idle and active mode transitions, pinned area information, etc.) can be consolidated with memory elements (or vice versa), or the storage can overlap/exist in any other suitable manner.

In one example implementation, UE 112, RAN node 114, access controller 122, data-plane node(s) 124, control-plane node(s) 126, source RAN node 116, and target RAN node 118 are network elements, which are meant to encompass network appliances, servers, routers, switches, gateways, bridges, loadbalancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms, communication protocols, interfaces and/or standards, proprietary and/or non-proprietary that allow for the effective exchange of data or information.

In various embodiments, UE 112, RAN node 114, access controller 122, data-plane node(s) 124, control-plane node(s) 126, source RAN node 116, and target RAN node 118 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112, RAN node 114, access controller 122, data-plane node(s) 124, control-plane node(s) 126, source RAN node 116, and/or target RAN node 118 could be provided in any database, register, control list, cache, or storage structure: all of which can be referenced at any suitable timeframe. Any such storage options may be included within the broad term 'memory element' as used herein. Similarly, any of the potential processing elements, modules, controllers, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the operations as outlined herein may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor (e.g., a hardware processor) can execute any type of instructions associated with data to achieve the operations detailed herein. In one example, the processors can transform an element or an article (e.g., data, information) from one state or thing to another state or thing. In another example, the activities outlined herein to facilitate optimized idle and active mode transitions may be implemented with logic, which can include fixed logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
    determining that a first user equipment (UE) of a plurality of UE is approximately stationary for a threshold period of time within a particular geographic area based, at least in part, on a radio access network (RAN) node, wherein each UE of the plurality of UE is in communication with the RAN node via a corresponding first connection and wherein the RAN node is in communication with a core network via a plurality of second connections corresponding to the plurality of UE that individually correspond to a given UE of the plurality of UE;
    notifying the first UE that the first UE has been associated with the particular geographic area; and
    transitioning the first UE into an idle mode from an active mode, wherein the transitioning maintains the existing second connection established between the RAN node and the core network for the first UE and releases the first connection between the RAN node and the first UE.

2. The method of claim 1, further comprising:
    storing context information for the first UE at the RAN node when the first UE transitions to the idle mode.

3. The method of claim 1, wherein the particular geographic area is associated with at least one of:
    an identity of the RAN node; and
    a cell identity for the RAN node.

4. The method of claim 1, wherein determining that the first UE is approximately stationary further comprises:
    monitoring mobility signaling from the first UE to determine an amount of time that the first UE has been attached to the RAN node; and
    comparing the amount of time with the threshold period of time to determine when the amount of time is greater than or equal to the threshold period of time.

5. The method of claim 1, further comprising:
    notifying the core network when the first UE moves out of the particular geographic area.

6. The method of claim 5, wherein the notifying includes notifying an access controller within the core network.

7. The method of claim 6, wherein the notifying is performed via Non-Access Stratum (NAS) signaling sent from the first UE to the access controller.

8. The method of claim 1, further comprising:
    transitioning the first UE to an active state for at least one of:
        sending downlink data or signaling to the first UE; and
        receiving uplink data or signaling from the first UE.

9. The method of claim 8, wherein the transitioning is performed without signaling the core network that the first UE has been transitioned from the idle mode to the active mode.

10. The method of claim 9, wherein the transitioning includes only setting up radio bearers for the first UE.

11. One or more non-transitory tangible media encoding logic that includes instructions for execution that when executed by a processor, is operable to perform operations comprising:
    determining that a first user equipment (UE) of a plurality of UE is approximately stationary for a threshold period of time within a particular geographic area based, at least in part, on a radio access network (RAN) node, wherein each UE of the plurality of UE is in communication with the RAN node via a corresponding first connection and wherein the RAN node is in communication with a core network via a plurality of second connections corresponding to the plurality of UE that individually correspond to a given UE of the plurality of UE;
    notifying the first UE that the first UE has been associated with the particular geographic area; and
    transitioning the first UE into an idle mode from an active mode, wherein the transitioning maintains the existing second connection established between the RAN node and the core network for the UE and releases the first connection between the RAN node and the first UE.

12. The media of claim 11, the operations further comprising:
    storing context information for the first UE at the RAN node when the first UE transitions to the idle mode.

13. The media of claim 11, wherein determining that the first UE is approximately stationary further comprises:
    monitoring mobility signaling from the first UE to determine an amount of time that the first UE has been attached to the RAN node; and
    comparing the amount of time with the threshold period of time to determine when the amount of time is greater than or equal to the threshold period of time.

14. The media of claim 11, the operations further comprising:
    notifying the core network when the first UE moves out of the particular geographic area.

15. The media of claim 11, the operations further comprising:
  transitioning the first UE to an active state for at least one of:
    sending downlink data or signaling to the first UE; and
    receiving uplink data or signaling from the first UE.

16. The media of claim 15, wherein the transitioning is performed without signaling the core network that the first UE has been transitioned from the idle mode to the active mode.

17. The media of claim 16, wherein the transitioning includes only setting up radio bearers for the first UE.

18. A system comprising:
  an access controller comprising at least one first memory element for storing first data and at least one first processor that executes instructions associated with the first data;
  a Radio Access Network (RAN) node comprising at least one second memory element for storing second data and at least one second processor that executes instructions associated with the second data;
  the access controller, when the at least one first processor executes the instructions, being configured to:
    determine that an first user equipment (UE) of a plurality of UE in communication with the RAN node is approximately stationary for a threshold period of time within a particular geographic area based, at least in part, on the first UE being connected to a core network via the RAN node, wherein each UE of the plurality of UE is in communication with the RAN node via a corresponding first connection and the RAN node is in communication with the core network via a plurality of second connections corresponding to the plurality of UE that individually correspond to a given UE of the plurality of UE;
    notify the first UE that the first UE has been associated with the particular geographic area; and
  the RAN node, when the at least one second processor executes the instructions, being configured to:
    transition the first UE into an idle mode from an active mode, wherein the RAN releases the first connection for the first UE and maintains the second connection for the first UE.

19. The system of claim 18, wherein the access controller, when the at least one first processor executes the instructions to determine that the first UE is approximately stationary, is further configured to:
  monitor mobility signaling from the first UE to determine an amount of time that the first UE has been attached to the RAN node; and
  compare the amount of time with the threshold period of time to determine when the amount of time is greater than or equal to the threshold period of time.

20. The system of claim 18, wherein the RAN node, when the at least one second processor executes the instructions, is further configured to:
  transition the first UE to an active state for at least one of:
    sending downlink data or signaling to the first UE; and
    receiving uplink data or signaling from the first UE.

* * * * *